(12) United States Patent
Linder et al.

(10) Patent No.: US 10,136,591 B2
(45) Date of Patent: Nov. 27, 2018

(54) AUTOMATIC LEVELLING OF A FELLER HEAD

(71) Applicant: Komatsu Forest AB, Umeå (SE)

(72) Inventors: Daniel Linder, Umeå (SE); Erik Nilsson, Obbola (SE)

(73) Assignee: Komatsu Forest AB, Umeå (SE)

( * ) Notice: Subject to any disclaimer, the term of this patent is extended or adjusted under 35 U.S.C. 154(b) by 86 days.

(21) Appl. No.: 15/104,946

(22) PCT Filed: Dec. 20, 2013

(86) PCT No.: PCT/SE2013/051610
§ 371 (c)(1),
(2) Date: Jun. 15, 2016

(87) PCT Pub. No.: WO2015/094072
PCT Pub. Date: Jun. 25, 2015

(65) Prior Publication Data
US 2017/0000045 A1    Jan. 5, 2017

(51) Int. Cl.
*A01G 23/081* (2006.01)
*A01G 23/091* (2006.01)

(52) U.S. Cl.
CPC ......... *A01G 23/081* (2013.01); *A01G 23/091* (2013.01)

(58) Field of Classification Search
CPC ............................ A01G 23/081; A01G 23/091
See application file for complete search history.

(56) References Cited

U.S. PATENT DOCUMENTS

| 4,650,017 | A | 3/1987 | Pelletier et al. |
| 4,708,577 | A | 11/1987 | Fratzke |
| 4,823,852 | A | 4/1989 | Langford |
| 6,173,973 | B1 | 1/2001 | Robinson |
| 2013/0291999 | A1* | 11/2013 | Orcutt .................... B67D 7/145 141/1 |
| 2014/0178166 | A1* | 6/2014 | Andruch, III ........... B66C 13/18 414/743 |

OTHER PUBLICATIONS

International Search Report received for PCT Patent Application No. PCT/SE2013/051610, dated Jun. 25, 2015, 4 pages.
International Preliminary Report on Patentability received for PCT Patent Application No. PCT/SE2013/051610, dated Jun. 30, 2016, 7 pages.
International Search Report and Written Opinion received for PCT Patent Application No. PCT/SE2013/051610, dated Aug. 22, 2014, 9 pages.

* cited by examiner

*Primary Examiner* — Yuen H Wong
(74) *Attorney, Agent, or Firm* — Morrison & Foerster LLP

(57) ABSTRACT

The present invention concerns a method for the lateral levelling equipment of a timber working head at a forestry machine with a hydraulic system for the driving and regulation of the functions of the forestry machine, which forestry machine comprises a chassis with a driver's cabin and an arm to which a timber working head is fixed jointed and in a manner that allows rotation, the working head comprising levelling equipment and a regulator for the control and regulation of the lateral angle of the working head relative to the vertical direction, an arrangement for the execution of the method, and a forestry machine for the use of the arrangement during the execution of the method.

14 Claims, 2 Drawing Sheets

AUTOMATIC LEVELLING OF A FELLER HEAD

CROSS-REFERENCE TO RELATED APPLICATION

This application is a U.S. National Stage patent application of PCT/SE2013/051610 filed on Dec. 20, 2013, the entire contents of which are incorporated herein by reference.

TECHNICAL AREA

The present invention concerns a system and a method for the automatic levelling of a timber working head that is arranged at a forestry machine.

BACKGROUND

During forestry operations, tool carriers are used to which a working head for harvesting/felling/stacking has been attached. The tool carrier may be a wheeled or tracked chassis with an arm that is attached in a jointed manner at a slewing ring. The arm is divided into a boom and a stick, which are joined to each other at a joint and which in this way achieve a large working area, through it being possible to fold the arm together and shorten it, or to unfold the arm and extend it. The working head is attached to a tool fixture at the extreme end of the stick in a manner that allows it to be removed, or directly attached at the extreme end of the stick. The working head comprises a frame with means to grip a tree and hold it fixed against the frame. Furthermore, the working head comprises a cutting arrangement to cut the tree. The cutting arrangement may be of the type with a guide bar and chain, a rotating disk, a flywheel, or a cutter. Furthermore, the chassis is provided with a driver's cabin in which a driver sits and operates the forestry machine.

If the ground is sloping, the working head must be directed in towards the trunk of the tree, since the trees grow essentially vertically. The driver maneuvers the arm and places the working head against a tree, after which the tree is cut down. Using prior art technology, the working head can be adjusted, leveled, in a vertical direction seen in the direction of the arm. If the ground is, however, sloping, the working head must be manually adjusted by the driver from the driver's cabin. This alignment against the trunk places high demands on the driver, since the alignment is a time-consuming procedure. In order to achieve as good a cutting as possible, the working head must be essentially vertical even if the ground, and thus also the forestry machine, is sloping.

The term "lateral direction" is here used to denote the direction that is transverse to the direction in which the arm is jointed. This can be described in a coordinate system as the z-direction, if the direction of jointing of the arm relative to the stick is described as the x-direction (horizontal) and the jointing of the arm relative to the chassis is described as the y-direction (vertical).

SUMMARY OF THE INVENTION

The purpose of the present invention is to facilitate the alignment of the working head against a tree even if the ground is sloping in the lateral direction, and in this way to solve the problems of the prior art technology described above. The invention will be described below with reference to the attached drawings.

DESCRIPTION OF EMBODIMENTS

Figure 1A:
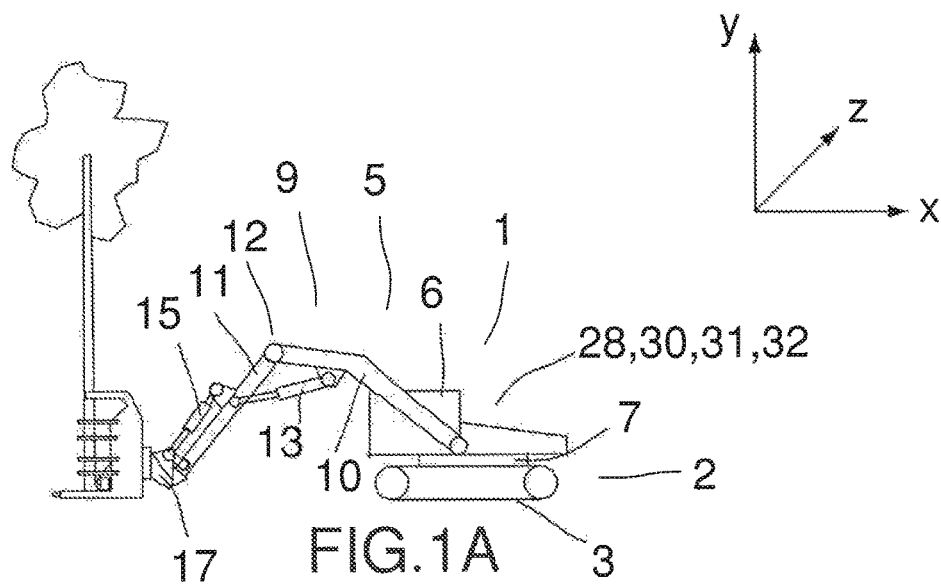
FIGS. 1A-1C show a side view of a forestry machine with a working head that is tilted in the vertical direction.
Figure 1B:
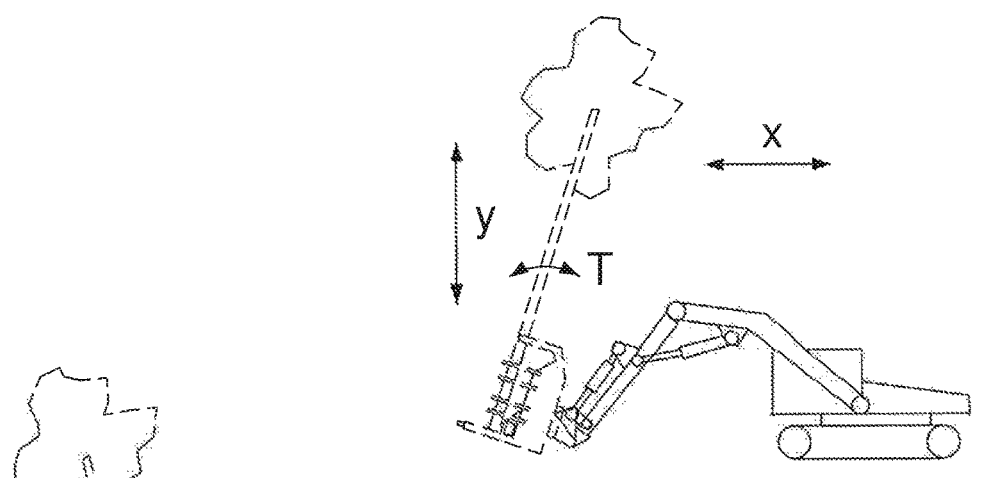
Figure 1C:
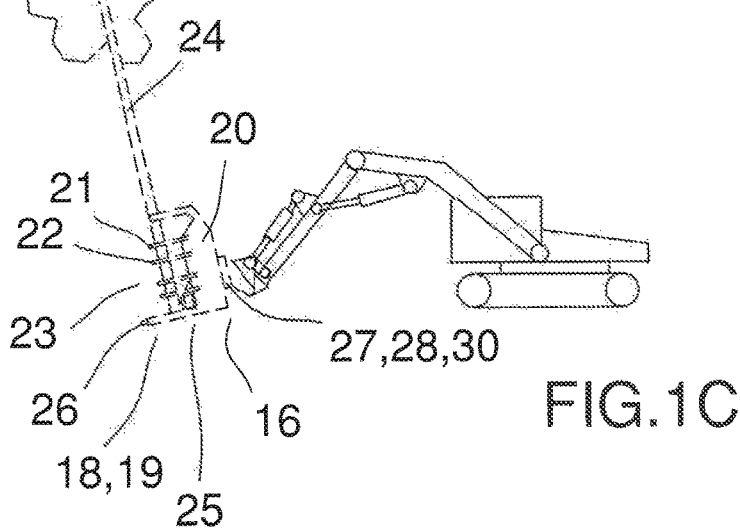

FIGS. 1A-1C show a forestry machine 1 in the form of a tracked tool carrier, tree feller, tree stacker, seen from the side. It comprises a chassis 2 with endless tracks 3 on each side for the propulsion of the machine through the terrain. It is an advantage if the propulsion takes place through hydraulic motors 4 connected to a hydraulic system 5. A driver's cabin 6 is located such that it can be rotated on a slewing ring 7 arranged at the chassis 2 and it can be rotated through 360 degrees in the plane 8 of the chassis. The driver's cabin 6 comprises the customary controls for the control of the forestry machine 1 and for the regulation of its function. A folding arm 9 is mounted jointed at the chassis 2 and it comprises in known manner a boom 10 and a stick 11, which are mounted jointed relative to each other. The arm 9 is of the type that is commonly found in, for example, excavators, and it is mounted jointed in a conventional manner at the chassis 2. The hydraulic system comprises in known manner hydraulic cylinders, lines, valves, hydraulic motors and pumps that drive in known manner that functions of the forestry machine 1.

The free outermost end 12 of the arm 9 can be maneuvered vertically, in the y-direction, with the aid of a hydraulic cylinder 13, a piston-cylinder unit, connected to the hydraulic system 5. An additional arm, which is known as the "stick" 11, is attached jointed at the free end 12 of the arm. The stick 11 can be maneuvered in the same direction as the arm, in the vertical direction, through a piston-cylinder unit 15 arranged between the boom 10 and the stick 11. The arm and the stick give a pattern of motion with a controlled motion, where the free end 16 of the stick 11 can be maneuvered towards or away from the chassis 2. A tool fixture 17 is arranged at the free end 16 of the stick for the attachment of a tool 18 in a manner that allows it to be removed, which tool in this embodiment is a harvesting head. The head can in another embodiment be a felling head or a stacking head. The tool fixture 17 is jointed in a manner that allows it to be maneuvered in the longitudinal direction of the stick and the arm, this motion is also known as "tilting", T. The head may in another embodiment be directly attached to the free end 16 of the stick.

The working head 18 comprises in this embodiment a harvester unit 19 with an extended frame 20 with at least one holder arm 21 and one grip arm 22. An indentation 23 that extends in the longitudinal direction of the frame 20 has been made in the frame. This is an accumulation compartment for the accumulation of cut trees 24. The term "holder arm" 21 is here used to denote an arm that can be regulated in a manner that can hold a sawn tree fixed against the frame. The term "grip arm" 22 is here used to denote a similar arm, although this arm is jointed. When the arm grips a tree 24, it is clamped against the frame, after which the tree is cut. The subsequent tree is clamped against the grip arm, and the grip arm is able, due to the fact that it is jointed, to slide out between the two trees such that both of the trees are held fixed by the holder arm. A certain number of trees can be gripped and held fixed in the manner that is described above, until the accumulation compartment is full.

The end of the frame 20 that faces the ground is arranged with a cutting arrangement 26. The cutting arrangement comprises a rotating disk or a flywheel with a large mass. The disk is driven by a motor, and it is an advantage if this is carried out by direct driving through a hydraulic motor. It is an advantage if the motor is driven by the hydraulic system of the forestry machine. The motor is arranged inside the frame of the working head and is in this way protected from external influence by tree trunks that are held against the frame.

The cutting arrangement may, in another embodiment, be of the type that comprises a guide bar with a saw chain, or another type of cutting arrangement.

The frame is arranged with a regulator 27 for the maneuvering of the frame 20 relative to the arm 9 and the tool fixture 17. The regulator 27 may comprise a rotator, a hydraulic motor or an electric motor equipped with a cogged wheel that interacts with a cogged rod or a cogged gear at the tool fixture, or a hydraulic cylinder between the frame and the tool fixture.

The working head 18 is arranged with means for the control of the position of the head in the vertical direction 14, the tilt motion. This term is used to denote the tilt of the working head 18 towards or away from the chassis 2. If the boom 10 and the stick 11 are located, for example, at their outermost, extended position with the head 18 adjusted to its vertical position and if the arm 9 is subsequently maneuvered such that the head approaches the chassis 2, the head 18 must be maneuvered with the vertical regulator such that its upper part is tilted in towards the chassis, in order to maintain its vertical position. It is an advantage if this regulation takes place using a piston-cylinder unit arranged between the stick and the tool fixture.

Figure 2A:
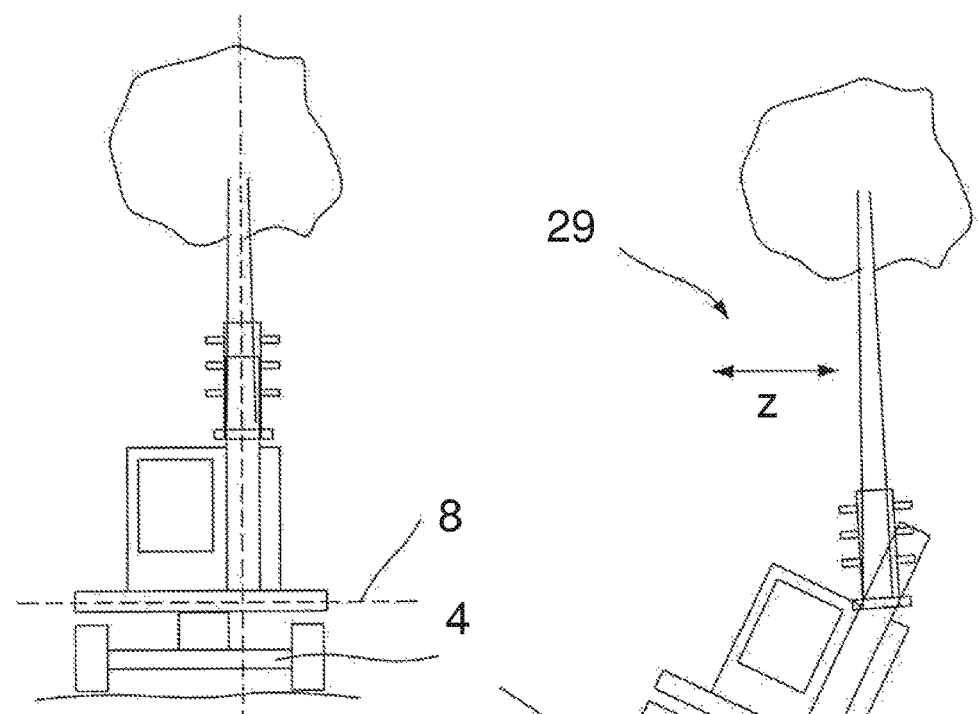
FIGS. 2A-2C show a view of a forestry machine seen from the front with a working head that is tilted in the lateral direction.
Figure 2B:
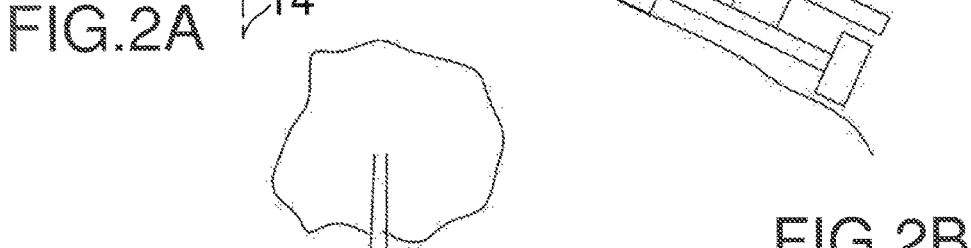
Figure 2C:
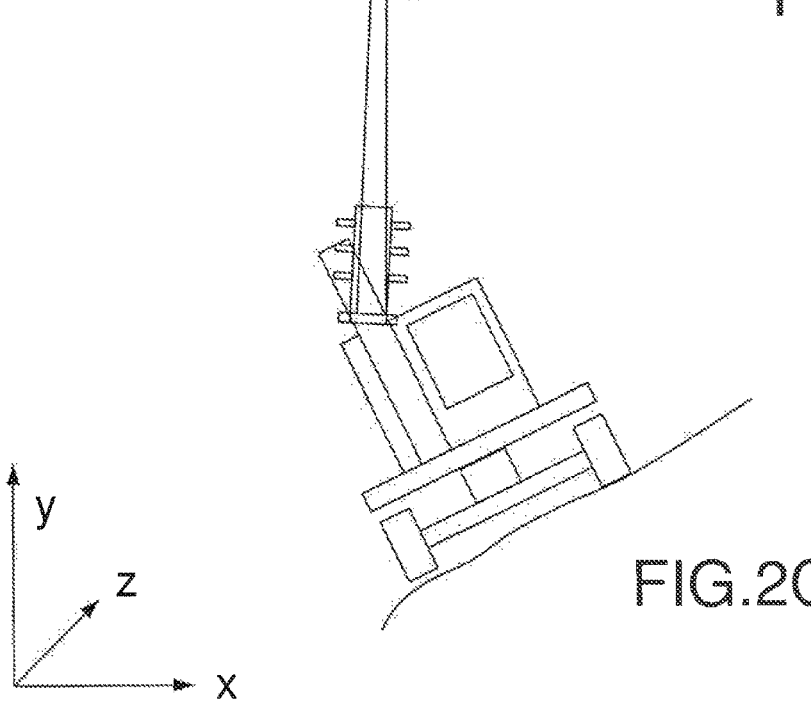

In addition, the head is arranged with levelling equipment 28 for the control of the lateral tilt 29 of the working head 18 as is shown in FIGS. 2A-2C. This term is used to denote the tilt of the working head 18 in the sideways direction, the z-direction, seen from a plane through the arm in the longitudinal direction of the arm. The levelling equipment 28 comprises in its simplest embodiment a level, but it may also comprise gyrosensors or other electronic or mechanical levelling equipment. The levelling equipment determines the lateral tilt 29 of the working head and compares the tilt with the vertical plane.

When the forestry machine 1 moves along a slope, such that the track 3 or the wheels on one side of the chassis 2 are located at a level that is different from that of the track or wheels on the other side of the chassis, the arm 9 is also tilted in a corresponding manner, i.e. it deviates from the vertical plane. When this is the case, the levelling equipment 28 records the deviation and generates a deviation signal, which is sent to a signal processor 31 in the form of a calculation computer. The deviation signal is collected from a sensor 30, which signal comprises, for example, the number of degrees that the head is tilted relative to the vertical plane. The vertical plane is constituted by, for example, the value zero (0), and the deviation is constituted by the value in degrees between minus (−) and plus (+), depending on which side the head 18 is tilted relative to the vertical plane. The signal processor comprises a control computer 32, a PLC, with a processor for the calculation of the deviation of the signal from the vertical plane, i.e. how many degrees minus or plus the tilt of the head deviates from zero. The signal processor 31 transmits a corrected signal to the control computer 32 of the hydraulic system, which control computer controls the flow of hydraulic fluid to the regulator 27. The regulator subsequently maneuvers the head to the vertical position. These deviation and correction signals are continuously transmitted during the forestry operations, whereby the working head continuously attempts to maintain a zero value for the tilt.

The deviation signal may, in another embodiment, be obtained from the increase in pressure that arises in the regulator when the tilt of the working head deviates from the vertical plane. The regulator must work when the head is tilted in order to maintain the vertical direction, even if the forestry machine, and thus also the arm, are tilted. It should be realised that when the working head is in its vertical position, independently of the tilt of the forestry machine, the load on the regulator is at its minimum, and that this load increases as the head starts to tilt. When the head is tilted, the pressure in the regulator must increase in order to counteract the tilt, and with it the rotation at the regulator. This increase in pressure is used as a deviation signal, which is transmitted to the signal processor in the manner described above, whereby the lowest possible increase in pressure is aspired to in the regulator.

A further variant of deviation signal comprises a signal that is generated from the tilt of the chassis 2 or cabin 6. The chassis or the cabin comprises levelling equipment in the form of an angle gauge that measures the tilt of the chassis or the cabin relative to the vertical plane. This angular deviation provides a deviation signal that regulates the tilt of the working head.

The lateral adjustment described above takes place continuously. One example is if the forestry machine 1 is standing on a slope as described in the example above, and if the accumulation compartment 23 of the working head 18 is full of cut trees. The driver of the forestry machine will in this situation deposit the bundle of cut trees at a position at which the bundle does not obstruct further work. In order to reach this position, the driver rotates on the slewing ring 7 through, for example, 180 degrees. The working head 18 would tilt considerably in a sideways direction laterally during this rotation, due to the slope of the ground, and this would cause large breaking forces from the weight of the bundle on the working head 18, the tool fixture 17, the arm 9 and the attachment of the arm at the slewing ring 7, if the automatic lateral levelling operation were not carried out. Due to the automatic lateral levelling, the bundle will be positioned essentially vertically during the complete rotation motion, which facilitates the work and avoids the loads described above being exerted on the construction.

It should be realised that the automatic lateral adjustment can be switched of by a control (not shown in the drawings) inside the driver's cabin. This may be necessary when a bundle of trees is to be deposited from the working head 18 and where the properties of the ground, for example, do not allow the bundle to be deposited solely by the head being tilted, i.e. maneuvered in such a manner that it is led in the direction T in the longitudinal direction of the arm. When the rotation described above has been carried out and the head is located at the location at which the bundle is to be deposited, the driver can, by a button or similar, temporarily switch off the automatic lateral adjustment and regulate manually the lateral position of the working head, in order to avoid, for example, obstacles that are located in the vicinity of the deposit location. When the bundle has been placed on the ground, the driver can again switch on the automatic lateral adjustment and start to fill the head once again with trees. As a consequence of the levelling in the lateral direction, work can take place in a simplified manner without the driver needing to control the rotations of the working head relative to the machine and the vertical plane.

The present invention is not limited to what has been described above and shown in the drawings: it can be changed and modified in several different ways within the scope of the innovative concept defined by the attached patent claims.

The invention claimed is:

1. A method for lateral levelling of a timber working head at a forestry machine, wherein the forestry machine comprises a chassis with a driver's cabin and an arm to which the working head is fixed and allows rotation, the working head comprising levelling equipment and a regulator for control and regulation of a lateral angle of the working head relative to a vertical direction, the method comprising:
   a) recording a lateral position in the vertical direction, and a zero position corresponding to a vertical plane in the vertical direction, of the working head;
   b) bringing the working head out of the zero position;
   c) recording, by the levelling equipment, a deviation of the working head from the zero position, the deviation corresponding to the lateral angle defined between a longitudinal direction of the working head and the vertical plane when the working head tilts laterally away from the vertical plane in a direction that is transverse to a horizontal direction extending through the arm;
   d) generating, by the levelling equipment, a deviation signal;
   e) transmitting the deviation signal to a signal processor and receiving, by the signal processor, the deviation signal;
   f) defining, by the signal processor, the deviation from the zero position;
   g) transmitting, by the signal processor, a correction signal to a computer of a hydraulic system at the forestry machine; and
   h) maneuvering, by the regulator, the working head to the zero position.

2. The method according to claim 1, whereby the steps a)-h) are continuously repeated.

3. An arrangement for lateral levelling of a timber working head at a forestry machine, wherein the forestry machine comprises a chassis with a driver's cabin and an arm to which a working head is fixed and allows rotation, the arrangement comprising:
   a levelling equipment for control of a lateral angle of the working head relative to a vertical plane, the lateral angle defined between a longitudinal direction of the working head and the vertical plane when the working head tilts laterally away from the vertical plane in a direction that is transverse to a horizontal direction extending through the arm;
   a signal processor that generates a signal based on an angular deviation from the vertical plane; and
   a regulator for regulation of the working head in alignment with the vertical plane.

4. The arrangement according to claim 3, whereby the levelling equipment comprises an angular sensor.

5. The arrangement according to claim 3, whereby the levelling equipment comprises a pressure sensor.

6. The arrangement according to claim 3, whereby the levelling equipment comprises a gyroscope.

7. The arrangement according to claim 3, whereby the signal processor comprises a calculation computer and a control computer.

8. The arrangement according to claim 3, whereby the regulator comprises a rotator.

9. The arrangement according to claim 3, whereby the regulator comprises a hydraulic piston-cylinder unit.

10. The arrangement according to claim 3, whereby the regulator comprises an electric motor.

11. The arrangement according to claim 3, whereby the levelling equipment is arranged at the timber working head.

12. The arrangement according to claim 3, whereby the levelling equipment is arranged at the forestry machine.

13. The arrangement according to claim 3, whereby the regulator can be switched off by a control stick or button located in the driver's cabin.

14. A forestry machine comprising the arrangement according to claim 3.

* * * * *